W. H. MUZZY.
CASH REGISTER.
APPLICATION FILED SEPT. 22, 1905.

939,289.

Patented Nov. 9, 1909.
8 SHEETS—SHEET 1.

W. H. MUZZY.
CASH REGISTER.
APPLICATION FILED SEPT. 22, 1905.

939,289.

Patented Nov. 9, 1909.
8 SHEETS—SHEET 3.

Witnesses

Inventor

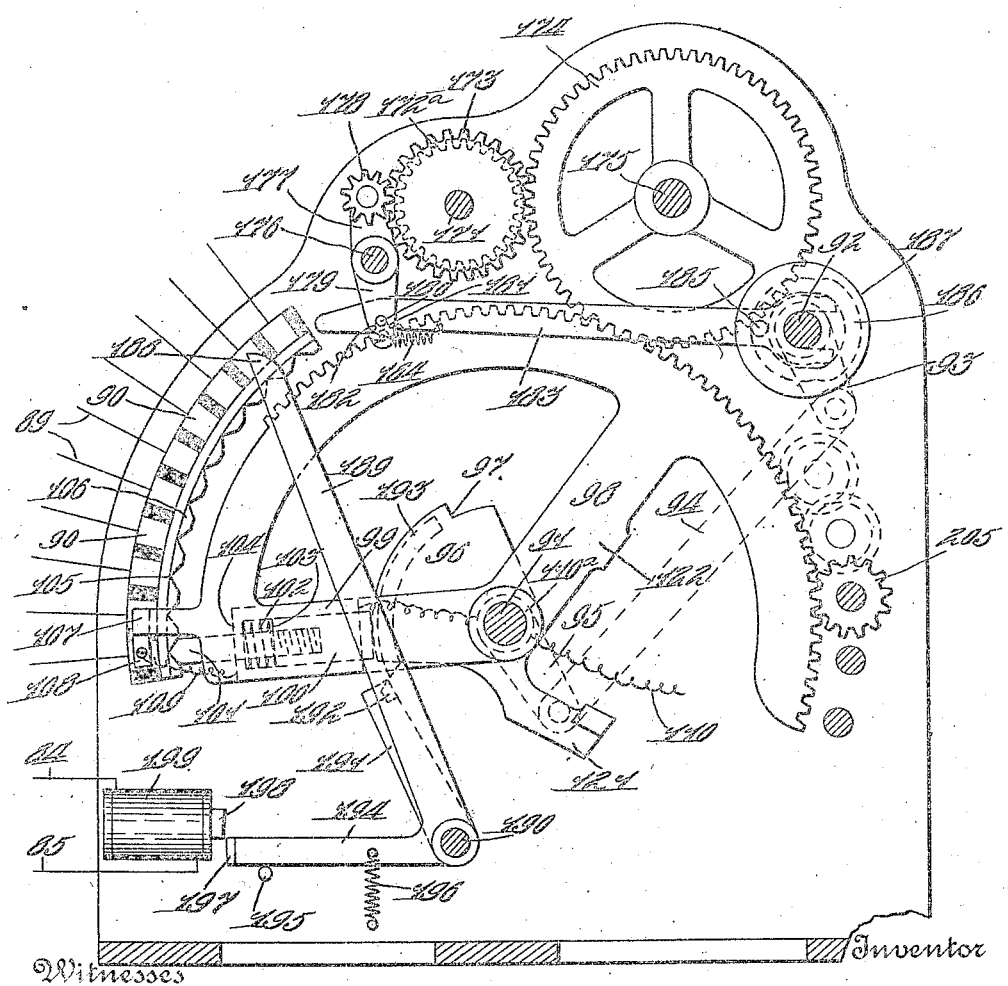

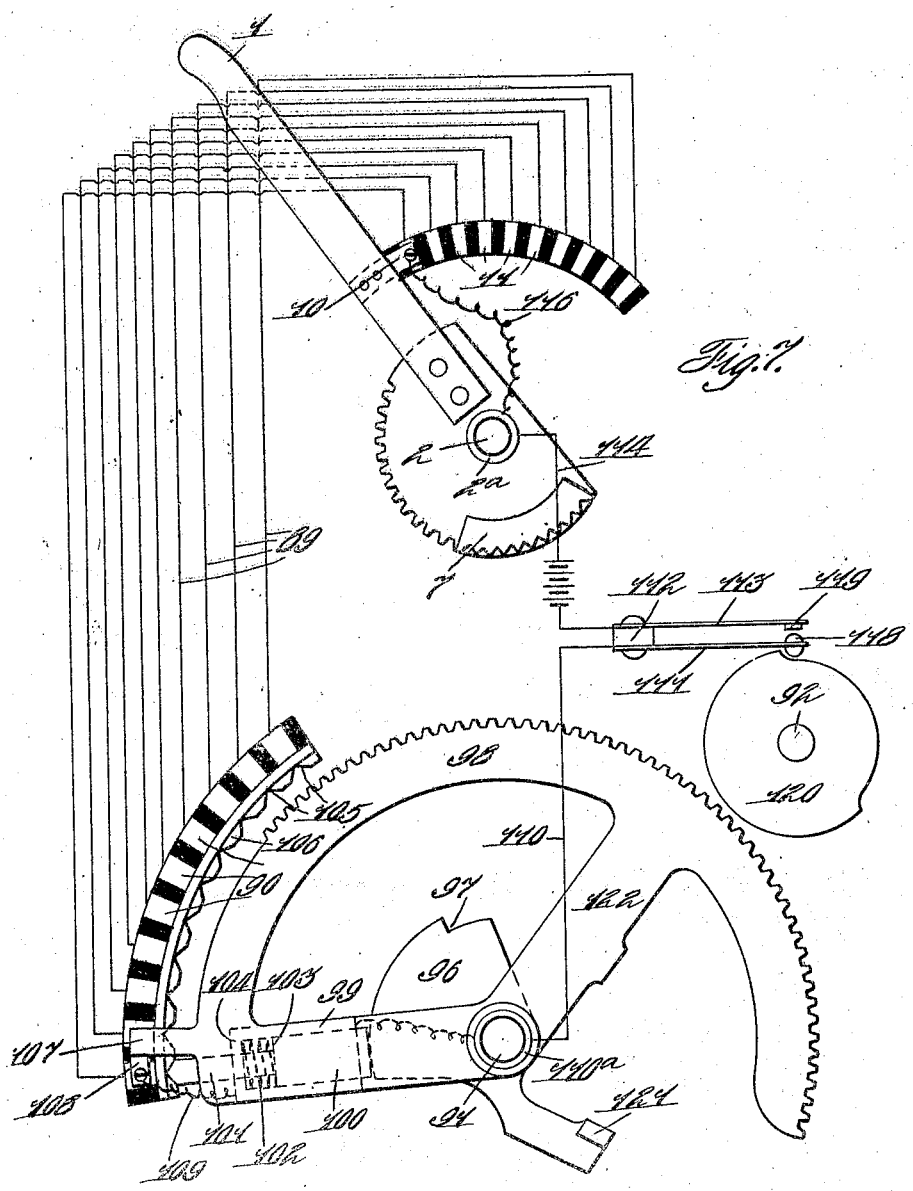

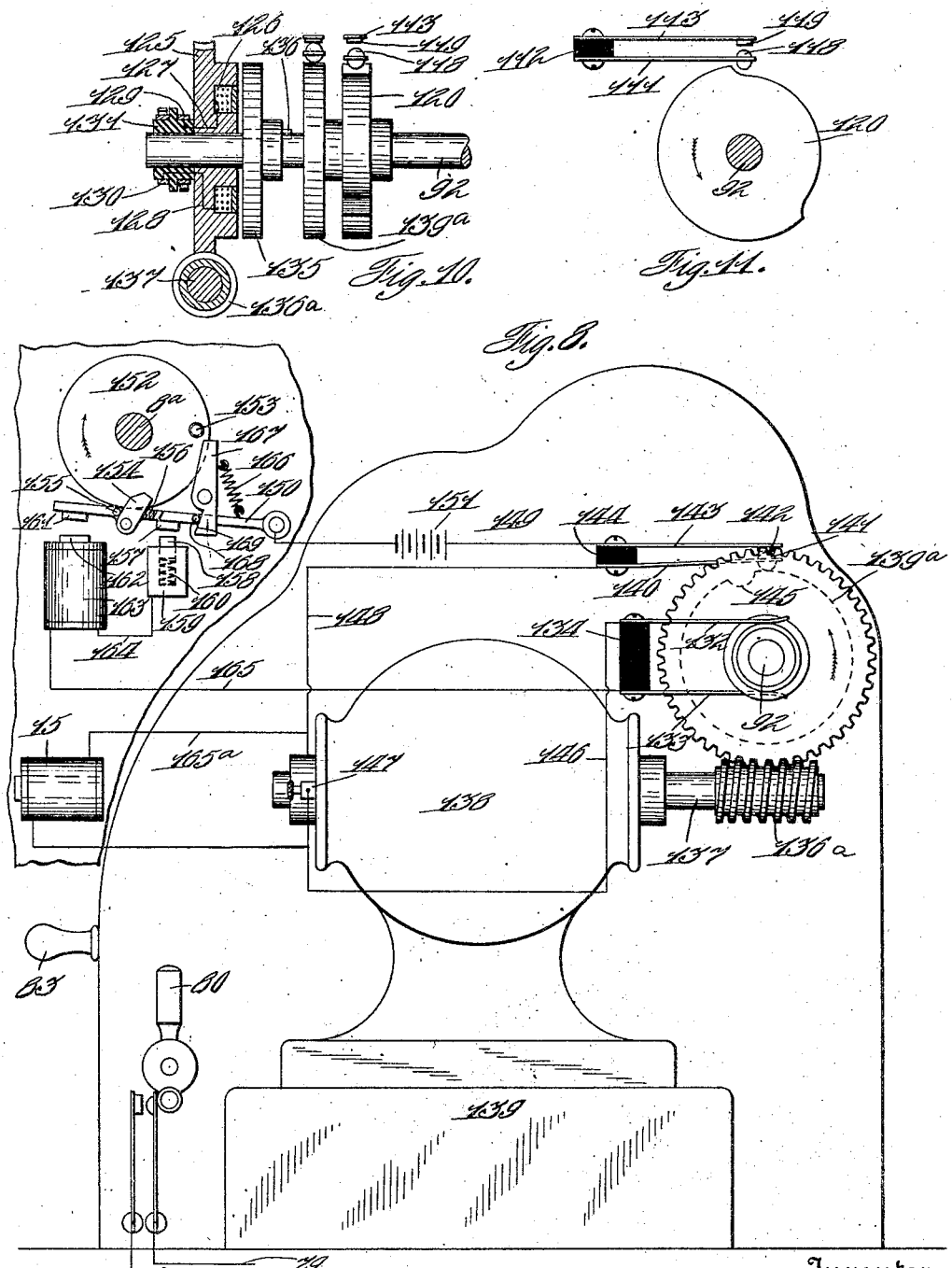

W. H. MUZZY.
CASH REGISTER.
APPLICATION FILED SEPT. 22, 1905.

939,289.

Patented Nov. 9, 1909.
8 SHEETS—SHEET 7.

Witnesses

Inventor

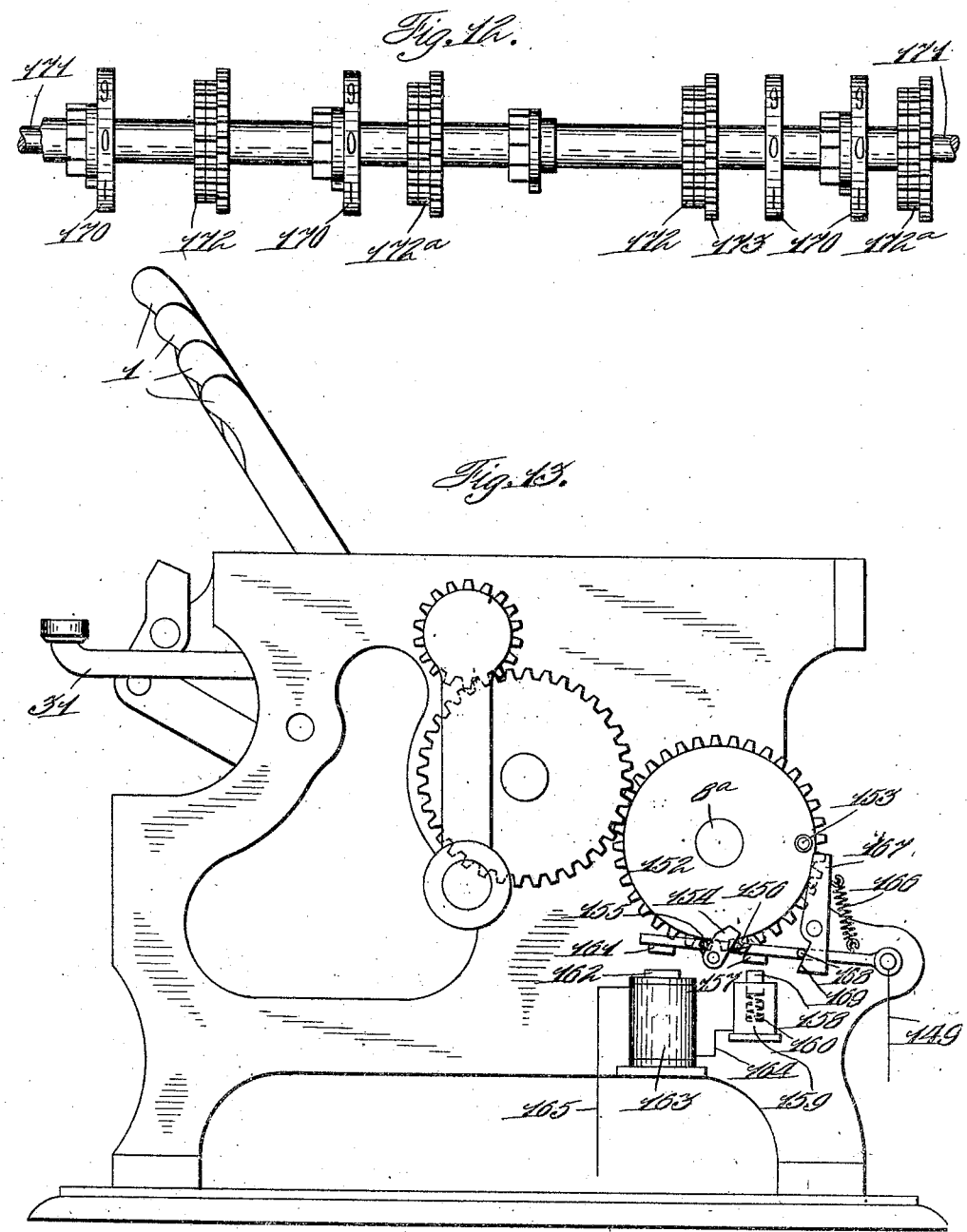

UNITED STATES PATENT OFFICE.

WILLIAM H. MUZZY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO (INCORPORATED IN 1906).

CASH-REGISTER.

939,289.

Specification of Letters Patent.   Patented Nov. 9, 1909.

Application filed September 22, 1905.   Serial No. 279,576.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash accounting mechanisms, and has more particular relation to machines for handling cash and credit sales in department stores or the like.

One of the several objects of the invention is to provide mechanism whereby the registration of a sale at a certain point in the store will be counted and recorded at a central or cashier's office at a distant point.

Another object of the invention is to provide improved devices for controlling the validating of credit or charge slips in different portions of a store from a central or validating office, where information relating to the different accounts is kept.

Another object of the invention is to provide improved mechanism in a registering machine, whereby this machine is free to operate for certain transactions, but is controlled from a distance for certain other transactions.

With these and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Figure 1:
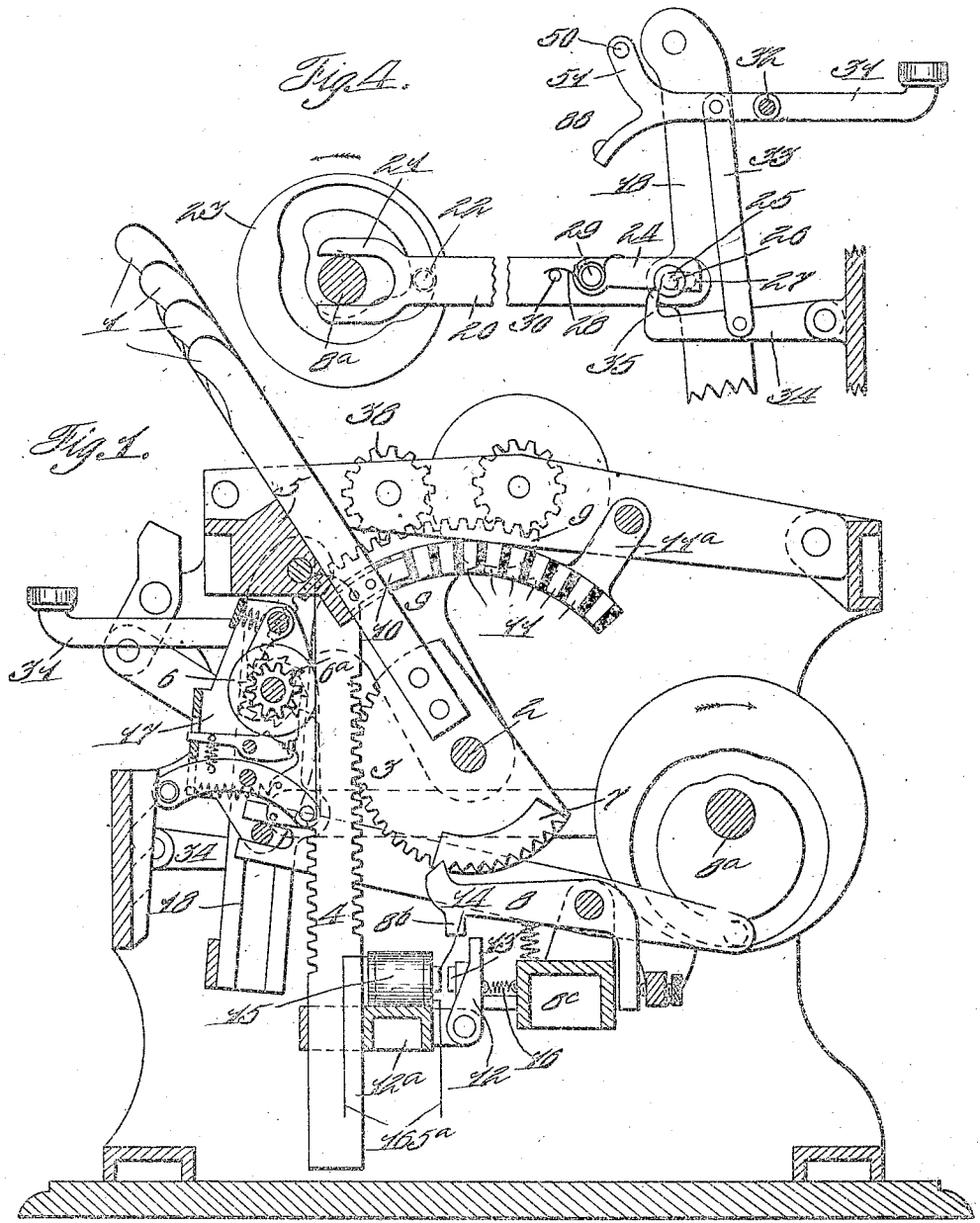
Figure 2:
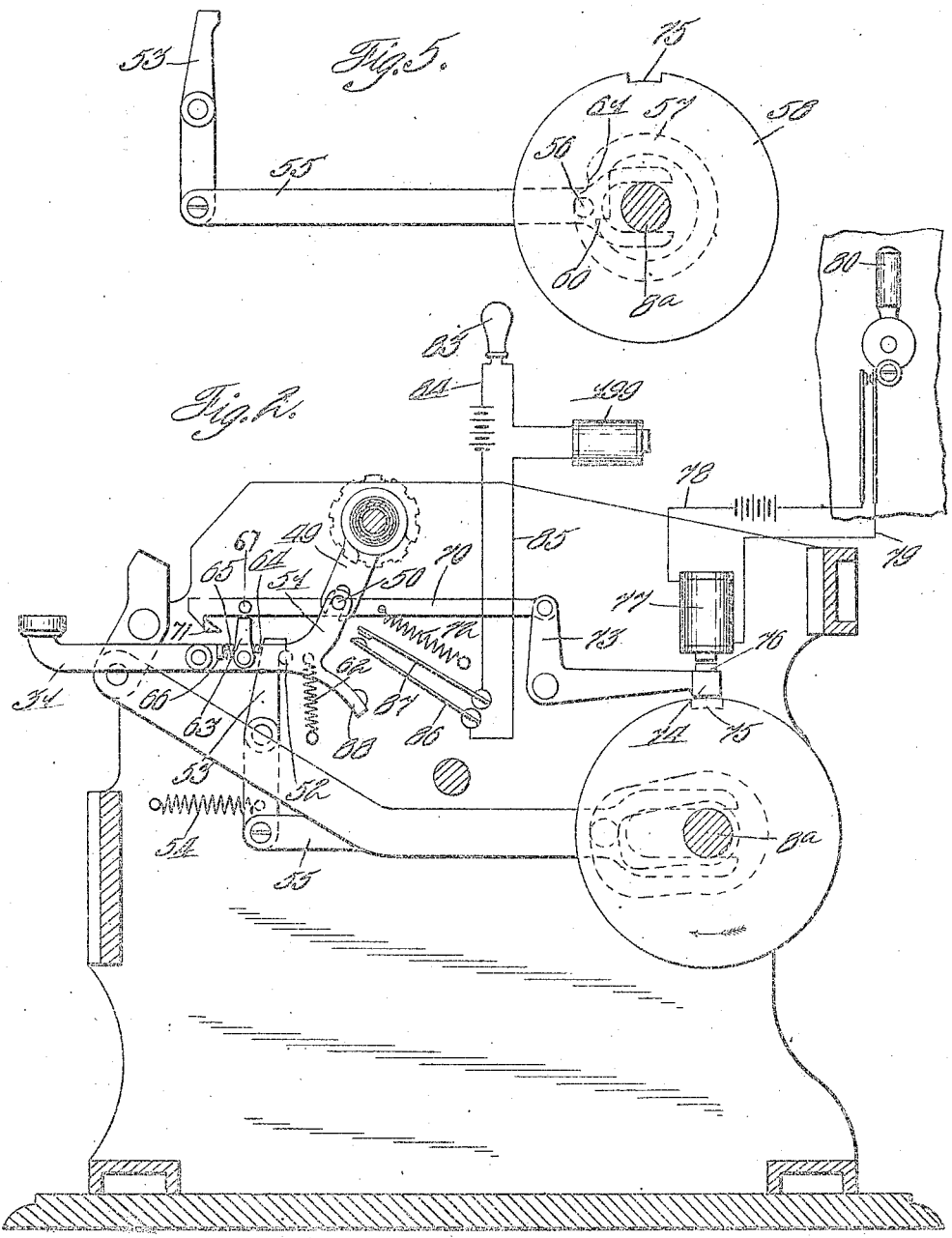
Figure 3:
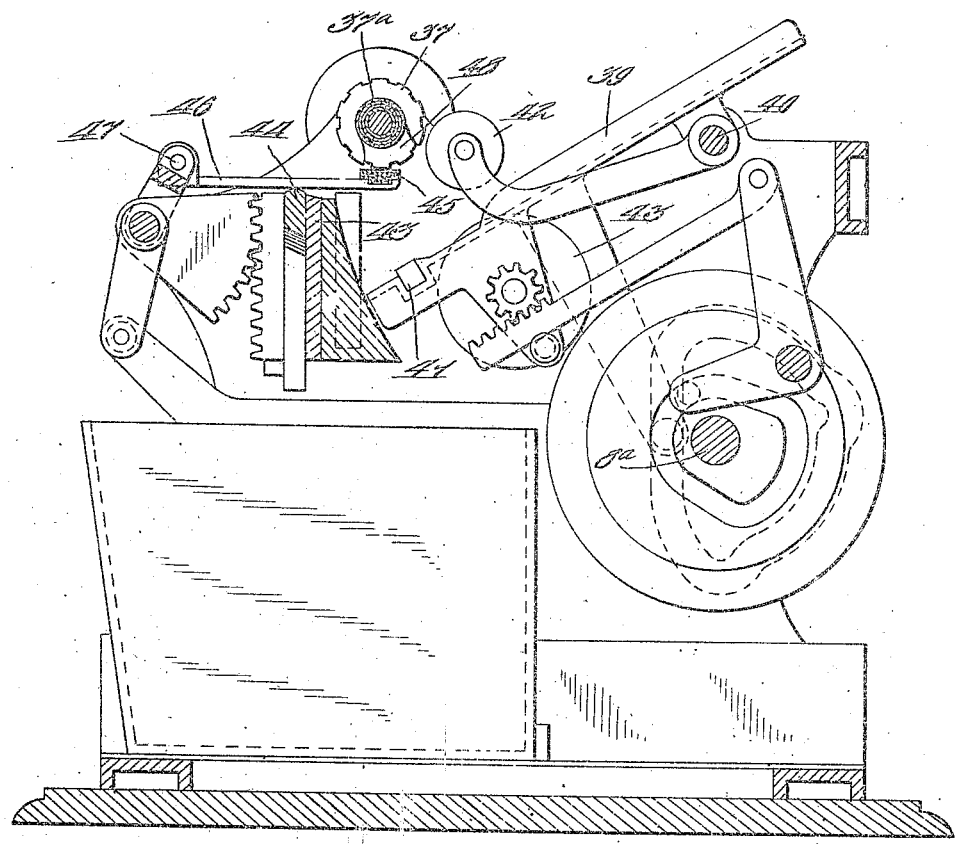
Figure 9:
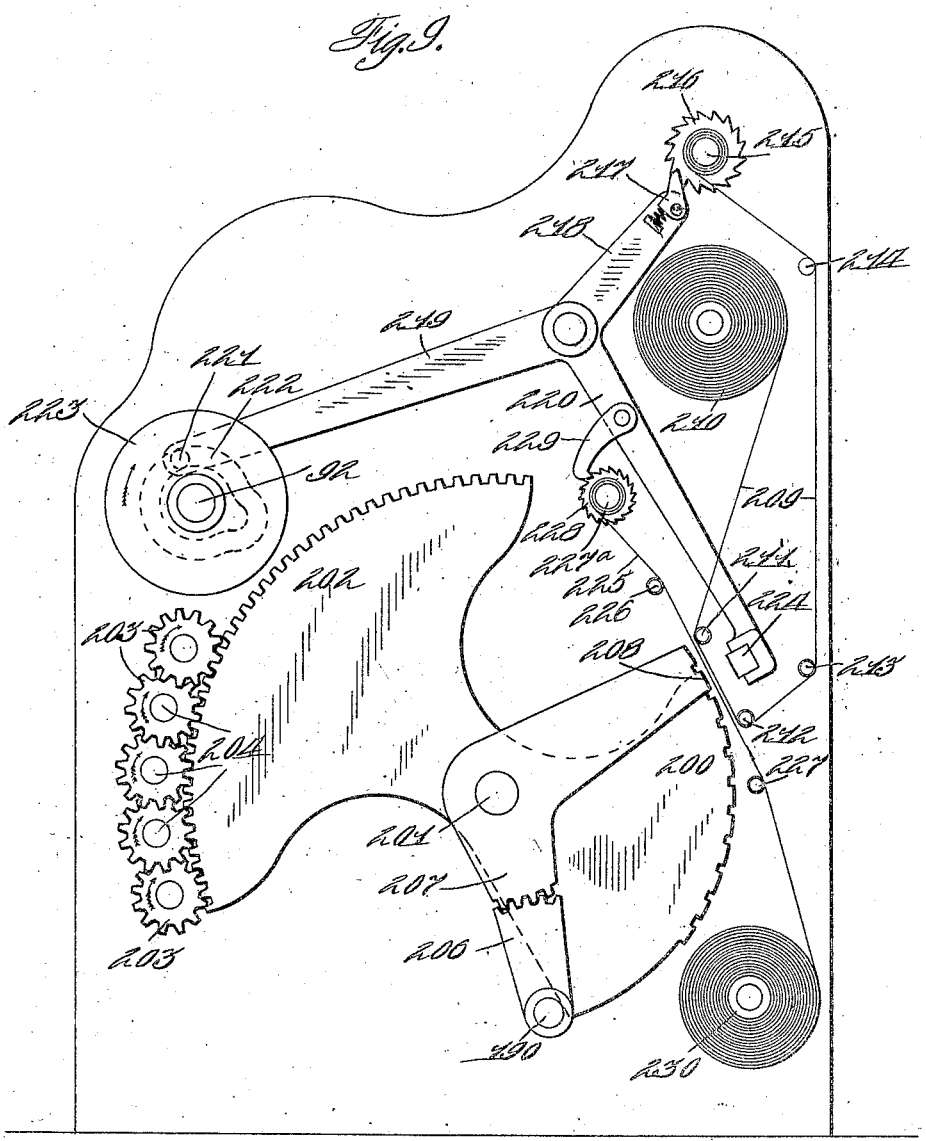

Of said drawings: Figure 1 represents a transverse vertical section through a machine of the type shown in English Patent #15,851 of 1903, issued to The National Cash Register Company, London, England, with my improvements applied thereto. Fig. 2 represents a similar section through the same taken on the line of the special validating charge key, illustrating the auditor's unlocking key and connections in diagram. Fig. 3 represents a transverse vertical section through the sending machine, taken just to one side of the printing table. Fig. 4 represents a detail side elevation of the mechanism for throwing out the counter of the sending machine. Fig. 5 represents a detail side elevation of the locking device and connections for the special key. Fig. 6 represents a transverse vertical section through the receiving machine, to be located at the credit or auditor's office. Fig. 7 represents a diagrammatical detail view, partly in elevation, of parts of the sending and receiving machines with their circuit controlling connections. Fig. 8 represents a diagrammatical view, partly in elevation, of the motor of the receiving machine and the main circuit controllers of the sending machine. Fig. 9 represents a side elevation of the receiving machine, illustrating the printer. Fig. 10 represents a detail side elevation, partly in section, of the magnetic clutch and the main circuit controllers. Fig. 11 represents a detail side elevation of the circuit controller for the several banks of the receiving machine. Fig. 12 represents a detail front elevation of the counter of the receiving machine, and Fig. 13 represents an end view of the sending machine, showing the operating handle and its connection with the main circuit controllers.

As many of the parts contained in the sending machine are old and well known in the art, as shown in the above mentioned English patent, I will refer to this patent for any detail description of such parts as is not hereinafter given. Further, considerable of the mechanical construction of the receiving machine is also old and well known in the art and is shown in the United States patent to Cleal and Reinhard, #580,378, April 13, 1897, and reference is also made to this patent for such description of the receiving machine as is not hereinafter fully given. Described in general terms, however, the sending machine may be said to comprise a series of pivoted levers 1, mounted upon a suitable supporting shaft 2 and provided with segmental operating racks 3. These racks mesh with a series of vertically movable rack-bars 4, which are suitably guided in the main frame 5 of the machine, and when set determine the amount to be added upon the movable counter 6, which will be hereinafter more particularly described. Each of the segments 3 is provided with a locking ratchet plate 7, which is engaged by one of a series of spring-pressed alining and locking pawls 8, suitably pivoted upon a cross-bar 8ᶜ of the main frame and co-acting with the plate 7 to latch and finally lock the levers 1 in substantially the same manner described in the aforesaid English patent, and substantially as shown in United States patent to Thomas Carroll, #751,611, dated February 9, 1904.

Each of the adjusting levers 1 is provided with a second segmental rack 9 for operating the printer and indicator wheels through suitable nested sleeves, as described in the aforesaid English patent. Further, each of the setting levers 1 is provided with a spring contact or commutator 10 which is insulated from the lever, and is so positioned as to pass over a series of insulated contact pieces 11 mounted upon a support 11ª, which is in turn suitably mounted on the main frame. There are ten of the contact pieces 11 corresponding to the ten positions of the setting levers 1, and representing 0 to 9. For instance, when the levers 1 are in their normal positions the commutators 10 will rest upon the contact pieces 11 representing zeros. Should one of the levers 1 be set to a position representing 5, for instance, its commutator 10 will then be resting upon the fifth contact piece 11. As these levers 1 become locked in the positions in which they are set because of the rotation of the main operating shaft 8ª by suitable gearing, fully described in the aforesaid English patent, it will be seen that after the operation of the machine is commenced the positions of the lever 1 cannot be changed to change the engagement between any of the commutators and the contact pieces. Further, as the sending machine may be operated so fast by hand as to complete its movement before the distant machine hereinafter described will have fully completed its operation, I provide further locking means for preventing any movement or readjustment of the levers 1 until the distant machine has fully completed its operation. The devices for effecting this result comprise a locking pawl 12, pivoted upon a cross-bar 12ª of the main frame, and normally lying out of the path of noses 8ᵇ, formed on the pawls 8, so that the pawls may be depressed upon the movements of the levers 1. The pawl 12 is provided with a soft iron armature 13, which lies in proximity to the end of the core 14 of the electro-magnet 15. When this magnet is energized, it will be seen that the pawl 12 is thrown under all of the lugs 8ᵇ and thus locks all of the pawls 8 and adjusting levers 1. When the magnet 15 is deënergized a coil spring 16 draws the pawls 12 backward out of the path of the lugs 8ᵇ and leaves the levers 1 free to be operated.

The circuit to the electro-magnet 15 is controlled from the receiving machine, as will be hereinafter more fully described.

As has before been stated, the movements of the said levers 1 cause a simultaneous movement of the racks 4. After these racks have been set the rotation of the shaft 8ª causes the counter carrying frame 17 to be drawn downward after the same has first been rocked inward by the supporting frame 18, substantially as described in the aforesaid English patent and the patent to Carroll.

The rocking of the frame 18, causing the pinions 6ª of the counter wheels to project into the same vertical plane with the teeth of the rack 4, is effected by an operating bar 20, best shown in Fig. 4. This bar is bifurcated, as at 21, and straddles the main rotation shaft 8ª, and is provided with an anti-friction roller 22, which plays in the groove of the box cam 23, which is mounted upon the shaft 8ª, and thus receives its reciprocation. Connection is made between the bar 20 and the frame 18 by pivoted pawl 24, mounted on the bar 20 and formed with a notch 25, the walls of which normally engage a headed pin 26, mounted on frame 18, and projecting through an elongated slot 27 formed in the bar 20.

The pawl 24 is normally forced down into its engaging position by coil spring 28 which surrounds pivot 29 and engages one end with said pawl and the other with a pin 30 mounted on the bar 20. The normal operation of this mechanism would be to oscillate the frame 18 upon each rotation of the shaft 8ª, and thus cause the counter wheels to be moved into a position to be rotated according to the values set up by the levers 1.

As it becomes necessary at times to record credit transactions, and as it is desired not to add credit transactions into the counter, means are provided for preventing the amounts set up by the racks 4 from being added upon the counter upon the operation of the machine. This mechanism comprises a pivoted credit key 31, mounted upon a shaft 32 and connected by link 33 with a hook 34, which is pivoted upon the main frame. The hook end 35 of this hook projects below the under side of the pawl 24, and normally free of the pin 26. When the key 31 is operated, however, the pawl 34 is thrown upward behind the pin 26 and against the pawl 24 and raises the latter free of the pin. The pin and frame 18 are thus locked in position, while the bar is uncoupled from the frame and reciprocates without moving the counter into position to be engaged by the rack teeth when the register is reciprocated.

As shown in Fig. 3, the left-hand end of the sending machine is provided with a series of printing wheels 37, mounted upon nested sleeves 37ª, connected by pinions 38 with the respective racks 9, whereby the printing wheels are set up according to the positions of the levers 1. A printing table 39 for the reception of the slips is pivotally mounted upon a shaft 40 and carries a printing platen 41 for forcing the paper checks against the inked types 37. This platen is given a double oscillation, and the check is fed forward by rollers 42 and 43, substantially as described in the aforesaid English patent. The voucher or end portion of the check is cut off by a movable knife 44, and the types 37 are inked by an ink-pad 45, carried by arm 46, mounted upon a pivoted frame 47 and actuated substantially in the manner described in said English patent.

A special printing segment 48, carrying a designation, such as O. K. credit, is also mounted upon one of the nested sleeves 37ᵃ and carries at its inner end a slotted arm 49, as best shown in Fig. 2. A pin 50, mounted upon an arm 51, of the key 31, projects into the slot of said arm 49, so that when the key 31 is depressed the printing segment 48 will be rocked to bring the O. K. credit type into printing position. When the key 31 is depressed a pin 52 mounted thereon forces forward a latching lever and passes above the same, whereby the key becomes locked in its depressed position. The lever 53 is normally thrown rearward at its upper end and against the pin 52 by a coil spring 54, which connects said lever to the main frame. The lower end of the lever is pivotally connected to a bar 55, bifurcated at its rear to straddle the shaft 8ᵃ and provided with an anti-friction roller 56, which plays in a cam groove 57 of the box cam 58, fast to the shaft 8ᵃ, as best shown in Fig. 5.

The wall of the cam slot 57 is formed with a shoulder 60, so located that after the movement of the shaft 8ᵃ has commenced the pin 56 will be locked against any movement, and the credit key will be correspondingly locked until the machine has again reached its home position. As the cam 58 approaches the home position a projection 61 in the cam groove engages the pin 56 and draws the bar 55 inward to disengage the upper end of the lever 53 from the pin 52 and thus permits the key 31 to be drawn back to its normal position by spring 62 which connects the key to the main frame. Key 31 also carries a spring-pressed pawl 63, held against movement in one direction by a pin 64 and free to move in the opposite direction against the tension of a spring 65 interposed between the pawl and a lug 66 upon the key. The upper end of this pawl 63 normally lies directly under a pin 67, mounted upon a latching bar 70, which is normally latched over a beveled lug 71 and so held against the tension of a spring 72 which connects the bar to the main frame.

The rear end of the bar is connected to a bell-crank lever 73, mounted upon the main frame and formed with a locking nose 74, adapted to enter a locking notch 75 formed in the cam disk 58. The rear end of the lever 73 is provided with a soft iron armature 76, arranged to be drawn upward by an electro-magnet 77. This magnet is connected by wires 78 and 79 to a switch key 80, which is located at the receiving machine, or in proximity to the same, and is mounted in any suitable frame or casing. Whenever the credit key is depressed it will be seen that the pawl 63 by this engagement with the pin 67 will disengage the forward hook end of the bar 70 from the lug 71, and thus permit the spring 72 to draw the bar rearward and cause the locking nose 74 to enter the locking notch 75. It is now impossible to operate the machine until the credit man has been communicated with and informed of the amount of the credit. If he is satisfied that the charge should be made he presses the key 80, which energizes the magnet 77 and draws the rear end of the levers 73 upward and relatches the forward end of the bar 70 over the lug 71. When the bar 70 moves rearward the pin 67 moves from over the pawl 63, and as the key 71 remains depressed the bar 70 in its next forward movement forces the pawl 63 forward and becomes latched over the lug 71, to hold the machine unlocked after the credit man has released his hold upon the switch 80. When the credit key 31 is operated it is necessary to communicate with or signal the credit man so that he will take down his phone to telephone to the operator of the sending machine, using any suitable telephone system in connection with the machines employed in this invention. This signal is transmitted to the credit man in the form of a flash lamp 83, connected by wires 84 and 85 and two contact springs 86 and 87 mounted in the frame of the sending machine and arranged to be brought together by an arm 88 of the key 31 when the key is depressed.

The object of the above mechanism is to provide means whereby charge or credit slips may be O. K.'d at the point where the sale is made without having to send to the cashier's or credit man's office, and to provide a quick and efficient service for credit customers. It will be seen from the above that no credit O. K. can be stamped upon a sales slip without the cashier first being communicated with, as the credit types cannot be set up without locking the machine, and the machine cannot be unlocked without the coöperation of the cashier.

As has before been said, whenever one of the levers 1 is adjusted to any position its commutator blade 10 is brought to rest upon one of the commutator sections 11. These sections, as best shown in Fig. 7, are connected by suitable wires 89 with corresponding sections 90 upon the receiving machine. In other words, the levers of the sending machine, four in number, represent, respectively, units of cents, tens of cents, units of dollars and tens of dollars; and the segments pertaining to these levers would thus be connected to the corresponding segments in the receiving machine pertaining to units of cents, tens of cents, units of dollars and tens of dollars. After one of the levers 1 has been brought to rest upon one of the segments 11, one portion of the circuit has been established, and the remaining and completing portion of the circuit is then established at the receiving station. This operation is effected in the following manner: The main power shaft 91 of the receiving machine, which as shown and described in the aforesaid patent to Cleal and Reinhard, is oscillated once upon each operation of the main rotary shaft 92 by a crank 93, connecting rod 94 and crank arm 95, all of which are shown in Fig. 6.

The shaft 91 carries a series of rigid segmental plates 96, each of which is formed with a locking notch 97. Loosely mounted upon the shaft 91 are a series of segmental racks 98, one beside each of the segments 96, and each of these segments is provided with a solenoid coil 99, within which operates a core 100, having a projecting locking pin 101, and which is normally held against the edge of the segment 96 by coil spring 102 interposed between the shoulder 103 formed on the core 100 and the end plate 104 of the coil 99. The end of the plunger 101 is beveled and is arranged to engage beveled notches 105 formed in a locking segment 106, which is secured to the frame of the machine in proximity to segments 90. Each of the segments 98 is formed with an arm 107, carrying a spring contact piece 108 insulated therefrom. A wire 109 is secured to this contact piece and passes about and forms the bobbin or coil 99 of the solenoid. The opposite end of the wire forming the bobbin 99 is connected to an insulated ring 110ª on shaft 91. A wire extends from this ring to a switch spring 111 mounted upon an insulated block 112, fast to the frame of the receiving machine, and which carries a second contact spring 113. Spring 113 is connected by a wire 114 to an insulated ring 2ª on the shaft 2 of the sending machine. It will of course be understood that while I provide only one of the wires 110 and 114, that these wires are branched at their ends to communicate with each of the insulated rings 110ª and 2ª. A suitable battery, or other source of electric energy, is interposed in wires 110 and 114. Wires 116 connect ring 2ª to their contact springs 10 in the sending machine, as best shown in Fig. 7.

It will be seen from the foregoing description that whenever one of the levers 1 is moved away from its normal zero position, its contact spring 10 will take up a position upon one of the segments 11, representing some character other than zero. The motor of the receiving machine being then set in operation, as hereinafter described, the segment 98, corresponding to the operated lever 1, will be actuated and moved forward until its spring 108 contacts with the segment 90, corresponding to the segment 11, upon which spring 10 is then resting. When this point is reached the circuit is closed through the coil 99, and the action of the solenoid is such as to draw the plunger 101 into one of the notches 105 of segment 106. When the plunger 101 moves forward the rear end of the core 100 is drawn out of the notch 97 and the disk 96 continuing its forward movement locks the plunger 101 in engagement with the proper notch 105, and thus locks the segment 98 in position.

In order to prevent any misoperation of the machine the circuit through the wires 89 is normally broken by the contact springs 111 and 113. The spring 111 carries a contact knob 118, while the spring 113 carries a contact piece 119. The rotary shaft 92 of the receiving machine is provided with a disk 120, which makes one-half of a revolution before camming the two contacts 118 and 119 together. This first half revolution of the shaft 92 returns all segments 98 that have previously been displaced from normal position; and during this time the circuits 89 must of course be broken, as otherwise some of the segments 98 might be arrested upon their return movements, and not upon their forward movements. The segments 98 are returned by arms 121, fast to segments 96, and contacting with arms 122 of the segments 98. In a backward movement of a segment 96 the notch 97 is brought into position to allow the core 100 to spring rearward and unlock the segment 98 before the bar 121 engages the arm 122 to force the segment back to its normal position. Should any of the levers 1 be left in their normal positions, it will be seen that when the corresponding segment 98 of the receiving machine is brought back to its normal position and the circuit thrown on at this time, that the segment 98 will become locked in its zero position, and that the forward movement of the segment 96 will lock it in this normal zero position.

As above stated, motion is transmitted to all of the segments 96, and through them to the registering segments 98 from the rotary shaft 92. One end of the shaft 92 projects beyond the side frame of the machine, and upon this projecting end is loosely mounted a worm wheel 125, hollowed out as at 126 to receive a winding of wire for converting the wheel into one member of a magnetic clutch. The ends 127 and 128 of the wire are connected to commutator rings 129 and 130, mounted upon an insulated sleeve 131, secured to and turning with the wheel 125. The commutator rings 129 and 130 are engaged by commutator springs 132 and 133, mounted upon an insulated block 134 and connected in circuit, as hereinafter described. The other member 135 of the clutch comprises a metallic disk, loosely mounted upon shaft 92, but splined thereto by key 136.

It will be seen from the above that the wheel 125 will normally freely rotate on the shaft 92, but that when the current is thrown through the coil of wire mounted on the wheel the latter becomes magnetized and draws the disk 135 firmly against it, and thus causes the shaft 92 to move with said worm wheel. The wheel 125 meshes with a worm 136ª fast to the armature shaft 137 of the motor 138, which is of any desired type and is mounted upon a suitable base 139 secured to the frame of the machine. Fast to the shaft 92 is a notched disk 139ª arranged to operate a contact spring 140 to force a contact piece 141 mounted thereon into engagement with a contact piece 142 carried by a companion spring 143. Both of the springs 140 and 143 are mounted upon an insulating block 144, secured to the frame of the machine. The notch 145 in the disk 139ª is to permit a momentary breaking of the circuit at the end of the operation of the machine, for purposes to be hereinafter described.

The circuits for controlling the operation of the motor 138 and the shaft 92 in connection with the sending machine are best shown in Fig. 8. By referring to this figure it will be seen that a wire 146 connects the clutch spring 132 to a binding post 147, representing one of the motor terminals. A wire 148 connects the other motor terminal to the spring 140. A wire 149 connects the spring 143 to a pivoted lever 150, mounted upon the frame of the sending machine; a suitable battery or other source of electric energy 151 being interposed in this wire. Shaft 8ª of the sending machine is provided with a disk 152, which in turn carries an operating pin 153. When the shaft 8ª is rotated by the crank handle of the sending machine the pin 153 contacts with a bevel pawl 154, pivoted on the lever 150 and normally forced into engagement with a stop pin 155 by coil spring 156, and thus depresses said lever 150. When the lever is thus moved downward a contact piece 157 mounted thereon is brought into engagement with a movable contact piece 158, mounted in an insulated socket 159, and normally forced upward by a coil spring 160, mounted in the socket below the pin 158. The lever 150 is also provided with an armature 161, which, when the lever is forced downward, is brought into proximity to the core 162 of the electro-magnet 163. The socket piece 159 is connected by a wire 164 to one terminal of the magnet 163, while the remaining terminal of this magnet is connected by a wire 165 to the spring 132 of the clutch in the receiving machine.

It follows from the above construction that when the shaft 8ª is rotated by the crank handle of the sending machine, the contact pieces 157 and 158 are brought together by the lever 150 being forced downward. The circuit is thus completed through the wires 149 and 165 to the receiving machine. The circuit is also thrown through the magnet 163, which results in the lever 150 being held down after the pin 153 passes free of the pawl 154. The circuit, as far as the sending machine is concerned, will remain unbroken until the receiving machine shaft 92 has made a complete or almost complete rotation. At this time the notch 145 will be brought opposite the contact piece 141 and will momentarily break the circuit by permitting the contacts 141 and 142 to separate. The momentum of the parts, however, will turn the shaft 92 a slight distance farther, which will again bring the contacts 141 and 142 together in the position shown in Fig. 8. The momentary breaking of the circuit through the electro-magnet 163 will release the lever 150 and the same will be thrown upward by a coil spring 166, which connects the lever to a pivoted locking pawl 167 mounted upon the main frame. When the lever 150 moves upward the contacts 157 and 158 are separated and the circuit is permanently broken.

The above described mechanism prevents the circuit to the receiving machine from being broken by the sending machine before the receiving machine has operated through its full cycle of movement and throws the control of the circuit on to the receiving machine itself. The lever 150 is provided with a pin 168, which contacts with an inclined face 169 of the pawl 167. When the lever 150 is depressed the pawl 167 will be thus rocked so that its upper end will be brought into the path of the pin 153 and the shaft 8ª will thus be locked against a second rotation as long as the lever 150 remains depressed. This construction prevents the second operation of the sending machine before the previous operation has been completed at the receiving machine.

As has before been described, the setting levers of the sending machine are locked by a pawl 12 controlled by magnet 15. This magnet is included in a shunted circuit 165ª, so that as long as the main circuit remains closed and the receiving machine is operating the said levers of the sending machine will be locked and thus prevent any possibility of these levers being moved before the transaction at the receiving machine has been completed.

It will be seen from the foregoing that the segments 98 of the receiving machine are first returned to their normal positions and then set to their new positions according to the values recorded on the sending machine. The receiving machine is constructed to both register and record the amounts of the different purchases and transactions. The registering mechanism comprises a series of counter wheels 170 mounted upon a transverse shaft 171 and carrying pinions 172. Duplicate pinions 172ª are loose upon the shaft 171 beside the pinions 172, and to which are fastened larger pinions 173. Gear wheels 174 mounted upon a transverse shaft 175 mesh with the pinions 173 and the segments 98, whereby the pinions 173 are rotated or oscillated simultaneously with the corresponding segment 98. As it is only desired to communicate upward movements of the segments 98 to the counter wheels, means are provided for connecting the pinions 172 and 172ª only when the pinions 173 are moving in a forward direction. These means comprise a rocking shaft 176, carrying a series of arms 177, supporting pinions 178. These pinions are of sufficient breadth and are so located that when the shaft 176 is rocked they are brought into mesh with the companion pinions 172 and 172ª and lock the same together for synchronous movement.

The shaft 176 is rocked by an arm 179 fast thereto and provided with a pin 180, which is normally engaged by the walls 181 of the notch 182, formed in a reciprocating bar 183, the arm 179 and bar being connected by a coil spring 184. The rear end of the bar 183 is bifurcated and straddles the shaft 92. This bar is provided with a pin 185, which projects into a cam groove 186 formed in a cam disk 187, fast to the said shaft. The cam groove is of such formation as to reciprocate the bar 183 at the proper periods to bring the pinions 178 into mesh with the pinions 172 and 172ª. When it is desired to print or record certain amounts which are not to be added upon the counter, the forward end of the bar 183 is elevated to free it of the pin 180, so that the reciprocation of said bar will not affect the arm 179. This is effected by the beveled upper end 188 of the lever 189 engaging the forward end of the bar 183. The lever 189 is mounted upon a rock shaft 190, which shaft carries an arm 191 provided with a beveled lug 192, which coöperates with the beveled end of flange 193, fast to one of the segments 96, so that after the lever 189 is given a slight rocking movement the operation of the segment 96 will cause it to have a further or full movement to elevate the bar 183 and throw out the counter; all of which is substantially similar to the construction shown and described in the aforesaid patent to Cleal and Reinhard.

The lever 189 is provided with an extension 194, normally drawn downward against a stop pin 195 by a coil spring 196. This extension 194 is provided with an armature 197, which normally lies below the core 198 of an electro-magnet 199. This magnet 199 is included in the circuit represented by the wires 84 and 85, which may be termed the credit circuit. Thus whenever the credit key 31 of the sending machine is depressed the magnet 199 will be energized and partially rock the lever 189. The further operation of the lever will then be effected upon the operation of the receiving machine by the flange 193 camming the lug 192 to the rear. This will throw out the counter, and the subsequent movements of the segments 98 will result in no addition taking place. The segments 98 are also utilized for setting the printing segments 200, best shown in Fig. 9. These segments are journaled upon supporting shaft 201, and each of the same is formed with a gear segment 202. These gear segments mesh with pinions 203 upon the outer ends of shafts 204. These shafts are mounted in the main frame and carry pinions 205 on their inner ends, which mesh with the segments 98. The shaft 190 is provided with a gear segment 206, which meshes with a segment 207, journaled on the shaft 201, and carrying types 208 for designating cash or credit. When the shaft 190 is adjusted for a credit sale, it will be seen that the types 208 will be adjusted to the printing position for printing a designation indicating that a credit sale has been made.

As it is desirable for the auditor to have plain view of the transactions that he is to validate, the detail strip, upon which the amounts are printed, is so positioned in the machine as to expose fifteen or twenty of the printed transactions. This detail strip 209 passes from a supply roller 210, mounted on the main frame, over guiding rollers 211, 212, 213 and 214 to a winding roller 215, the portion of the tape between the rollers 213 and 214 being held vertical, so that the numbers printed thereon may be readily seen through a suitable window in the front of the hood of the printing mechanism. The winding roller 215 is provided with a ratchet-wheel 216, engaged by an operating pawl 217. This pawl is mounted upon an arm 218, and is spring-pressed into engagement with the ratchet-wheel in such manner that the oscillations of the arm 218 will result in a movement of the ratchet-wheel 216 with a step by step movement. The arm 218 forms part of a lever having two other arms 219 and 220. The arm 219 carries a pin, which projects into a cam slot 222, formed in a cam disk 223, which is fast to the rotary shaft 92. The arm 220 carries a flexible platen 224 for forcing the paper strip and the ink ribbon against the types in printing position. This ribbon 225 is passed over suitable guide rollers 226 and 227 and is wound upon a receiving roller 227ª, carrying a feeding ratchet 228 engaged by a gravity pawl 229, fast to the arm 220. The ribbon 225 is drawn from a supply roller 230. Any other form of printing ribbon and feeding devices for the same may be employed, the construction shown being merely illustrated as one example of devices that may be employed in this connection.

With machines of the type herein described, it will be seen that the receiving or auditor's machine may be located at any desired point distant from the sending machine, either in the same building or in any other building, and that all the transactions recorded by the sending machine will be correspondingly recorded and counted on the receiving machine; and further, that no transaction representing a credit can be validated by the operation of the sending machine and the printing of the validating marks on the sales slip take place without first communicating with the cashier or auditor and getting his O. K. or approval of such credit sale. The mechanism for accomplishing this result is positive. Further, the telephone communication is immediately verified by the amount of the sale which is printed and added at the cashier's desk. For example, if the clerk down in the store desires to sell a bill of goods, amounting to $25, on credit, he first depresses his credit key and sets up $25 on the machine. He next places a sales slip in the machine and takes up the telephone to speak to the cashier or auditor, who has been called to the phone by the operation of the credit key. After stating to the credit man that Mrs. Smith wishes a credit of $25 the credit man, if willing to authorize credit, closes the unlocking circuit by the key 80, and the sending machine is unlocked. If it is desired to release the credit key so that after the credit call has been sent in to the credit man the machine will not be locked up if he finds it necessary to investigate an account, any suitable means for releasing this key may be provided. The operator then turns the crank handle of this machine and the sales slip is printed and the voucher cut therefrom and left in the machine. The O. K. or validating mark is printed on the sales slip, which is the authority for the bundle wrapper to wrap the goods and pass them from the store. Upon the operation of the sending machine the amount of the sale and the fact that it is a credit sale is immediately printed on the strip at the receiving machine, and the auditor is enabled to verify any credit sales which he has authorized, and to immediately call to account any operator who endeavors to register a different amount than that authorized by the auditor or cashier.

If so desired, one of the levers 1 of the sending machine may be utilized as a cashier's identification. For example, in the credit office of the store may be located a number of cashiers or auditors, any one of whom may answer a particular call at the phone. When he answers such a call he states his name to the operator at the sending machine, who sets up one of the levers to a letter representing this particular cashier. His mark or designation is thus printed upon the slip which he validates, and the corresponding mark or designation is printed upon the detail strip before him, showing that the operator correctly operated the machine to indicate the particular cashier who validated that particular transaction. It will thus be seen that credit sales may be handled at the sending machine with great rapidity, and at the same time the auditors or cashiers may keep a strict account of just what is going on at the sending machines, as any transactions, whether cash or credit, which are made at the sending machines are immediately duplicated at the receiving machine. Thus credit limits and the responsibility of different cashiers for the authorized credits may be strictly followed, and any mistakes of the operators may be detected.

The above devices are intended particularly to supplant such systems or mechanisms as require the sending of sales slips to a central office or cashier's desk for validation, as such systems entail an immense amount of detail work by the auditors or cashiers and also occasion such delay as to cause considerable ill feeling on the part of the purchaser because of the length of time he has to wait in having his credit investigated. With an immediate telephone communication and validating system, such as outlined above, all waiting on the part of the customer is prevented and all credit sales are validated almost instantly, without sending parcels, packages or slips to a central point of authorization.

It will be observed that by the peculiar safety attachments which are provided in the several circuits that no matter how fast the sending machine may be operated, either carelessly or intentionally, the circuits cannot be broken nor the operation of the receiving machine interrupted until such operation has been completed and the machine has passed through its regular cycle of movement in a certain specified time, when all the parts will automatically resume their normal positions. Further, it will be seen that while the receiving machine is electrically operated, at the same time its movements are positive, and the locking of the different parts which are differentially moved takes place in such a manner as to preclude any possibility of overthrow or incomplete operation.

It will also be understood that any number of sending machines may be employed in connection with the receiving machine, provided with means to add successively into the receiving machine.

While the form of mechanism here shown and described is admirably adapted to fulfil the objects primarily stated, it is to be understood that it is not desired to confine the invention to the one form of embodiment here disclosed, for it is susceptible of embodiment in various forms all coming within the scope of the claims which follow.

Having thus described my invention, what I claim as new, and desire to secure by Letters Patent, is—

1. The combination in a machine for printing a sales slip, of a validating device in said machine, means for locking the machine when the validating device is brought into operation, mechanism for unlocking the machine from a distance, and means for accounting at such a distant point for the transaction validated.

2. The combination with a sending machine, including a sales slip validating mechanism, of means in said machine for setting up the validating mechanism, a lock for said machine controlled by said means, a receiving machine located at a distance, means for operating the lock of the sending machine from the receiving machine, and means for accounting at the receiving machine for the character and amount of the transaction.

3. The combination with a sending machine, of a validating stamp therein, means for adjusting the stamp for operation, a lock for the sending machine, a receiving machine provided with means for unlocking the sending machine, and a signal at the receiving machine controlled by the setting device for the validating stamp at the sending machine.

4. The combination with a sending machine, of a validating stamp therein, means for setting the validating stamp, a lock for the sending machine, a receiving machine and connections for controlling said lock, and an accounting mechanism in the receiving machine connected to the sending machine, but thrown out of operative position when the validating device is operated.

5. The combination with a sending machine, of a slip printing mechanism therein, a validating stamp in said machine, means for setting said stamp, a receiving machine, an accounting mechanism in the receiving machine controlled by the sending machine, a lock for the sending machine, means at the receiving machine for controlling said lock, and means for preventing the adjustment of the sending machine while the receiving machine is being operated.

6. The combination with a sending machine, manually operated position determining devices for said machine, a receiving machine, motor-operated position determining devices at the receiving machine, electrical devices for controlling the receiving machine by the movements of the sending machine, and means connected to the receiving machine for momentarily breaking the circuit through said electrical devices.

7. The combination with a sending machine, of a printing mechanism therein, a special validating stamp in said machine, means for setting said stamp, a lock for the machine controlled by the setting means, electrical devices for operating the lock from a distance, and means for holding the lock in releasing position.

8. The combination with a sending machine having an accounting mechanism and a printing mechanism, of a validating stamp, a special key and connections for operating the stamp adapted to throw out the accounting mechanism, means for locking the machine when the special key is operated, and devices for releasing the locking means of the machine from a distant point.

9. The combination with a sending machine having suitable contacts and switch contacts, of a receiving machine controlled thereby having a series of contacts, a series of movable switch contacts, a series of oscillatory segments carrying the switch contacts, a driving mechanism for the segments, electro-magnet devices for coupling and uncoupling the segments from the driving mechanism, a circuit for said receiving machine and means for preventing completion of the electric circuit when the oscillatory segments are moving in one direction.

10. The combination in a machine for printing a sales slip, of a printing mechanism, a special key controlling a part of said mechanism, a lock for the machine controlled by the special key, a receiving machine, a signal at the receiving machine controlled by the special key, means for operating the lock of the sending machine from the receiving machine, and means for holding the lock in its unlocking condition irrespective of the position of the special key.

11. In a printing machine, the combination with a printing mechanism, of a special key for setting a portion of the same, a lock for the machine controlled by the key, means for operating the lock from a distance, and devices for holding the lock in an inoperative position irrespective of the position of the key.

12. The combination with a sending machine, including a printing mechanism, of a special setting device, a validating type connected to said device, a lock for the machine controlled by said device, an electrical mechanism for governing the lock, a receiving machine having a printing mechanism, counters in the respective machines, and mechanism controlled by the special setting element for throwing out the counters of the two machines when the said element is operated.

13. The combination with a sending machine, of a receiving machine including a series of oscillatory actuators, a driving mechanism for said actuators, electrically latched devices connecting said actuators to said driving mechanism, a motor connected to the driving mechanism, means for controlling the motor from the sending machine, and means controlling the sending machine from the receiving machine.

14. The combination with a sending machine, of a receiving machine, a motor and a circuit therefor for driving the latter, means for closing the circuit to the motor at the sending machine, a magnetic device at the sending machine for holding the circuit closed, means for breaking the circuit at the receiving machine, and means controlled by the magnetic device for preventing a second operation of the sending machine before the first operation is completed on the receiving machine.

15. The combination with a sending machine having a series of contacts, of a receiving machine having a corresponding series of contacts, means connecting the respective contacts, a series of oscillatory segments in the receiving machine, accounting mechanism controlled by these segments, solenoid latches mounted on the segments and energized through said contacts, locking plates engaged by the latches, and notched driving disks coöperating with the solenoid latches.

16. The combination with a sending machine, of a receiving machine, a motor for operating the receiving machine, manually operated means at the sending machine for controlling the receiving machine, a switch at the sending machine for completing the circuit to the motor of the receiving machine, and means for breaking the circuit to the motor at the receiving machine and again establishing it during the same operation.

17. In a machine of the class described, the combination with a mechanism for printing a record of transactions, of means for determining the transactions to be entered, means for rendering the printing mechanism inoperative when transactions of a particular class are to be printed, distant means for again rendering the printing mechanism operative, and means for printing the transaction including the class thereof at the distant point.

18. In a machine of the class described, the combination with an accounting mechanism, having means for printing transactions, of manually adjustable means for printing the classes of transactions entered, means controlled by said adjustable means for locking the accounting mechanism when a transaction of a particular class is to be entered, a distant controlling device having means for unlocking said accounting mechanism, and a distant indicating device brought into operation by the positioning of the adjustable means.

19. In a machine of the class described, the combination with an accounting mechanism, having means for printing transactions and their classes, of a key and means adjusted thereby for controlling the class printing means, means for rendering the said accounting mechanism inoperative when said key is given a particular adjustment, an indicating device at a distance brought into operation by said key adjustment, and a distant device for again rendering said accounting mechanism operative.

20. In a machine of the class described, the combination with a sending machine having differential elements and a register controlled thereby, of a distant receiving machine also having differential elements and a register controlled thereby, means for controlling the movements of the receiving differential elements from the movements of the sending elements, and a key at the sending device and mechanism controlled thereby for preventing operation of both registers.

21. In a cash register, the combination with a differential element bearing a switch contact, of a plurality of contacts over which the switch contact may move, a driving device having a constant excursion at each operation of the machine, a latch carried by said differential element for connecting same to said driving device, and a magnet in circuit with the switch contact for operating said latch to disconnect same from the driving device when a live contact is reached.

22. In a cash register, the combination with an operating mechanism, of a register operated thereby, an electromagnet and a circuit therefor, and a lever controlled by said magnet when the same is energized for preventing operation of said register.

23. In a cash register, the combination with a register, and an operating mechanism therefor, of a magnet and a circuit therefor, a lever operated by said magnet to prevent operation by said operating mechanism, and a special printing device set by said lever, for evidencing on a record that operation of the counter was prevented.

24. A cash register including an element movable to control the entry of different classes of transactions in the machine, in combination with an operating mechanism for said register, of means for locking the operating mechanism when said element has been adjusted for a certain class of transactions together with independent means operable from a distance for releasing said locking means.

25. The combination with a cash register having an entry determining element, of an operating mechanism for said register, means for locking the operating mechanism when the element is adjusted for a particular class of transactions, and independent electrically operated means for releasing said locking means from a distance.

26. The combination with a cash register having an entry determining element, of an operating mechanism for said register, means for locking the operating mechanism on the adjustment of said element to a particular position, and independent means operable from a distance for releasing said locking means.

27. The combination with a cash register having manipulative amount determining elements and a special transaction element, of an operating mechanism for said register, means for automatically locking the operating mechanism when the transaction element is given a particular adjustment, and independent electrically controlled means for releasing the locking means from a distance.

28. The combination with a cash register having a movable entry determining element, of means for rendering the entire register inoperative when said element is given a particular adjustment, and independent means for again rendering the register operative.

29. The combination with a cash register having an entry determining device, of means for preventing operation of the entire register when the entry determining means is adjusted for a particular transaction, and independent means operable from a distance for rendering the register again operative by releasing said preventing means.

30. The combination with a sending machine including a totalizing counter, devices for determining the amounts to be added on said counter, and a special key; of a receiving machine also including a totalizing counter, and devices for determining the amounts to be added on said latter counter; connections between the amount determining devices of the sending and the receiving machine, and connections whereby the operation of said special key prevents the addition of amounts on each of said counters.

31. The combination with a sending machine including a totalizing counter, devices for determining amounts to be added to said counter, and a special key; of a receiving machine also including a totalizing counter, and amount determining devices therefor; circuit connections whereby the amount determining devices of the sending machine control the corresponding determining devices of the receiving machine, and devices including a mechanical element in the sending machine and a circuit connection to the receiving machine, whereby the actuation of said special key prevents the addition of amounts to each of said counters.

32. A store service system comprising a cash register having means for retaining therein entries of transactions, in combination with means for rendering said register inoperative under certain predetermined conditions, said means being independent of the operation of the cash register, and means operable from a distance for disabling said latter means.

33. A store service system comprising a cash register having elements adjustable to control the transaction characteristics of entries in the machine, in combination with means for rendering the register inoperative when said elements are adjusted for a particular class of transaction, and means operable electrically for rendering the register again operative.

34. A store service system including a cash register having an element movable to determine transactions entered in the register, operating mechanism for said register, means for locking said operating mechanism normally in released position, means automatically locking said operating mechanism when said element is adjusted for the entry of a particular transaction, and means operable from a distance for releasing said locking means.

35. A store service system comprising the combination of a cash register having a transaction element, a locking means for the register normally restrained, but allowed to move to locking position when the element assumes a certain position, an electromagnet and a circuit including said magnet for releasing said lock, and a distant circuit controller controlling the energizing of said magnet.

In testimony whereof I affix my signature, in the presence of two witnesses.

WILLIAM H. MUZZY.

Witnesses:
E. L. PLATONEN,
WM. O. HENDERSON.